United States Patent [19]

Pischke et al.

[11] Patent Number: 5,239,234
[45] Date of Patent: Aug. 24, 1993

[54] METHOD OF IGNITING A GAS-DISCHARGE LAMP

[75] Inventors: Jürgen Pischke, Weissach; Wolfgang Gscheidle, Oberstenfeld, both of Fed. Rep. of Germany

[73] Assignee: Robert Bosch GmbH, Stuttgart, Fed. Rep. of Germany

[21] Appl. No.: 828,944

[22] PCT Filed: Jul. 21, 1990

[86] PCT No.: PCT/DE90/00552
§ 371 Date: Mar. 11, 1992
§ 102(e) Date: Mar. 11, 1992

[87] PCT Pub. No.: WO91/02442
PCT Pub. Date: Feb. 21, 1991

[30] Foreign Application Priority Data

Aug. 5, 1989 [DE] Fed. Rep. of Germany ....... 3925993

[51] Int. Cl.$^5$ .................. H05B 41/24; H05B 41/36
[52] U.S. Cl. .................... 315/119; 315/120; 315/129; 315/243; 315/DIG. 7
[58] Field of Search ............ 315/82, 83, 120, 129, 315/130, 131, 132, 241 R, 242, 243, 244, 209 T, 209 M, DIG. 2, DIG. 5, DIG. 7, 119

[56] References Cited

U.S. PATENT DOCUMENTS 4,053,813 10/1977 Kornrumpf et al. ................ 315/206
4,060,752 11/1977 Walker ................................. 315/244

FOREIGN PATENT DOCUMENTS 3432266 3/1985 Fed. Rep. of Germany .

OTHER PUBLICATIONS

Isermann, Rolf; "Identifikation dynamischer Systeme" vol. 1; Springer-Verlag; 1988; pp. 23-27.

Primary Examiner—David Mis
Attorney, Agent, or Firm—Michael J. Striker

[57] ABSTRACT

The method of igniting a gas-discharge lamp includes the steps of generating an exciting signal T in an operating circuit having an AC voltage generator on receipt of a lamp switch-on signal E by the operating circuit; exciting an ignition resonant circuit connected to a gas-discharge lamp with the exciting signal T to produce a decaying oscillating process, advantageously a decaying oscillating voltage, in the ignition resonant circuit; determining a resonant frequency of the ignition resonant circuit from the decaying oscillating voltage or process with a signal processing circuit, advantageously a microprocessor, connected to the ignition resonant circuit and operating the AC voltage generator at the determined resonant frequency by controlling the AC voltage generator with the signal processing circuit. The apparatus can be shut off or a warning signal generated when a predetermined parameter of the decaying oscillating process is exceeded.

6 Claims, 2 Drawing Sheets

METHOD OF IGNITING A GAS-DISCHARGE LAMP

BACKGROUND OF THE INVENTION

The invention relates to an apparatus and a method of igniting a gas-discharge lamp. Patent Application P 38 37 422.6-33 discloses a method of igniting a gas-discharge lamp, in which a voltage surge in a resonant circuit assigned to the gas-discharge lamp is used for the purpose of lamp ignition. The frequency of the output voltage of a operating circuit means for operating the gas-discharge lamp is fixed after switching on at a starting value which generally does not correspond to the resonant frequency of the resonant circuit. The frequency is subsequently varied in the direction of the expected resonant frequency. The known adaptive ignition frequency determination requires a certain time until the ignition frequency or the resonant frequency is found.

The book "Identifikation dynamischer Systeme" ("Identification of Dynamic Systems"), Rolf Isermann, Vol. 1, Springer-Verlag 1988, pages 23–27 describes different identification methods of processes to be controlled which use the application of test signals to the process to be investigated. Pulse signals or stepfunction signals, for example, are used as test signals. The identification of the process to be controlled is carried out at the start of the technical control task, in order to be able to set controller parameters suitably.

SUMMARY OF THE INVENTION

It is the object of the invention to ignite as quickly as possible a gas-discharge lamp to which an ignition resonant circuit is connected. A further object is to enhance the operational safety.

The method of the invention finds application in an inventive gas-discharge lamp apparatus including a gas-discharge lamp, an ignition resonant circuit connected to the gas-discharge lamp, an operating circuit means for the gas-discharge lamp connected to the ignition resonant circuit, the operating circuit means including an AC voltage generator connected to the ignition resonant circuit for operating the ignition resonant circuit, and a signal processing circuit means connected to the ignition resonant circuit for determining a resonant frequency of the ignition resonant circuit and also connected to the AC voltage generator for setting the AC voltage generator to oscillate at the resonant frequency.

According to the invention, the method of igniting a gas-discharge lamp comprises the steps of:

a. generating an exciting signal T in the operating circuit means on receipt of a lamp switch-on signal E by the operating circuit means;

b. exciting the ignition resonant circuit with the exciting signal T to produce a decaying oscillating process in the ignition resonant circuit;

c. providing a signal processing circuit means connected to the ignition resonant circuit for determining a resonant frequency of the ignition resonant circuit and also connected to the AC voltage generator;

d. determining a resonant frequency of the ignition resonant circuit from the decaying oscillating process with the signal processing circuit means; and e. operating the AC voltage generator at the resonant frequency determined in step d) by controlling the AC voltage generator with the signal processing circuit means.

In a preferred embodiment of the invention a signal is generated on overshooting at least one predetermined parameter of the decaying oscillating voltage. This signal can be used to shut off the operating circuit means or trigger a warning message.

The method according to the invention has the advantage that a short time after the occurrence of a lamp switch-on signal, the ignition resonant circuit, which is assigned to the gas-discharge lamp for generating an ignition voltage, is immediately operated at its resonant frequency by the circuit means for operating the gas-discharge lamp. Component tolerances and drift with ageing exert no more than a minor influence on the ignition process of the gas-discharge lamp.

In a particularly advantageous embodiment, the signal-processing circuit means, which detects the decay process of the oscillations of the ignition resonant circuit excited by the exciting signal, transmits a signal upon overshooting of at least one prescribable value of a decay coefficient. This embodiment enables a self-diagnosis of the entire arrangement around the gas-discharge lamp, and, if appropriate, switches off the operating circuit means for operating the lamp. Furthermore, enhancing the operational safety is possible by this development, since, for example, touching the lamp connections which conduct high voltage by maintenance staff can likewise be determined from the decay process, and it is possible to issue an appropriate warning message and, if necessary, switch off the operating circuit means.

The method according to the invention is explained in more detail with reference to the following description.

DETAILED DESCRIPTION OF THE PREFERRED EMBODIMENTS

Figure 1:
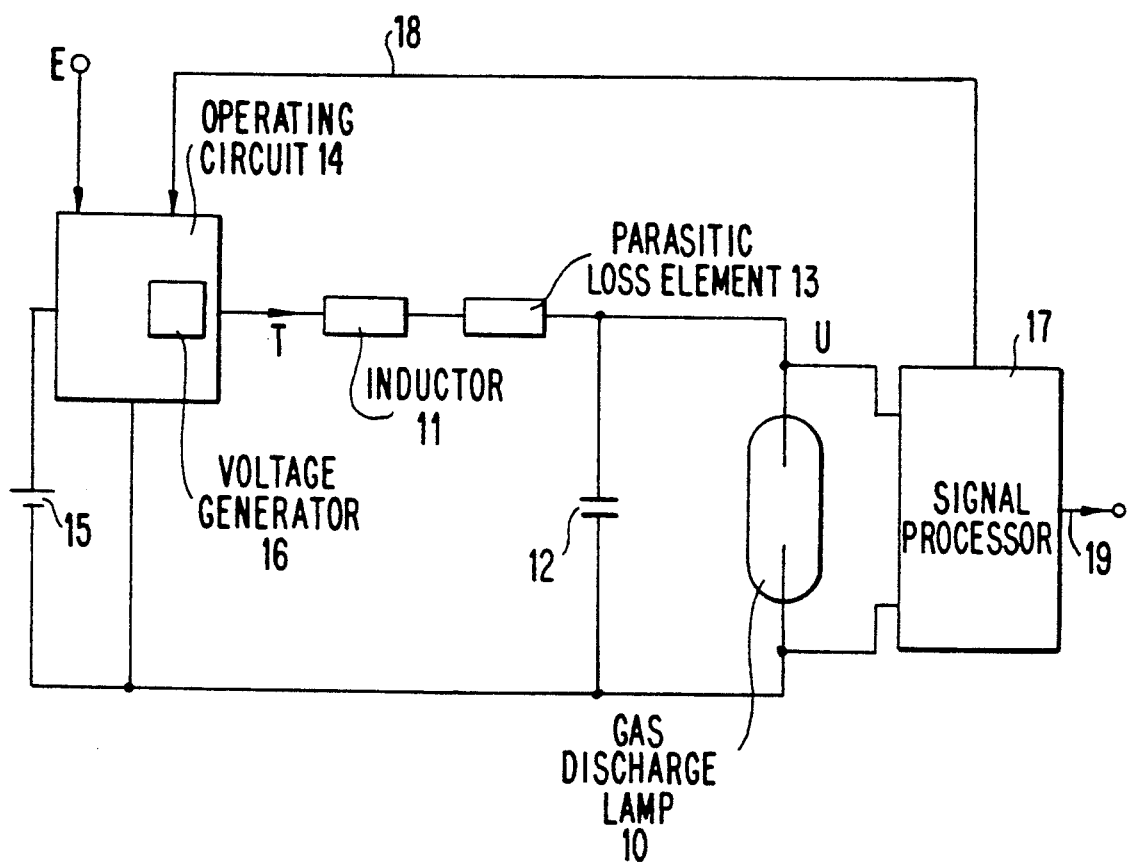
FIG. 1 is a block diagram of an arrangement for igniting a gas-discharge lamp.

FIG. 1 shows a gas-discharge lamp 10 to which there is assigned an ignition resonant circuit which contains an inductive element 11, a capacitive element 12 and a parasitic loss element 13. The resonant circuit 11, 12, 13 and the lamp 10 are supplied with energy, which is made available by an energy source 15, by an operating circuit means 14 for operating the lamp 10. The operating circuit means 14 contains an AC voltage generator 16 for exciting the resonant circuit 11, 12, 13. A lamp switch-on signal E is passed to the circuit means 14 to switch on the lamp 10. The signals occurring due to an exciting signal T in the resonant circuit 11, 12, 13 assigned to the lamp 10 are detected by a signal-processing circuit means 17 which feeds a control signal 18 to the operating circuit means 14 and, furthermore, transmits a fault signal 19. The signal-processing circuit means 17 in FIG. 1 detects, for example, the voltage U in the lamp 10.

Figure 2:
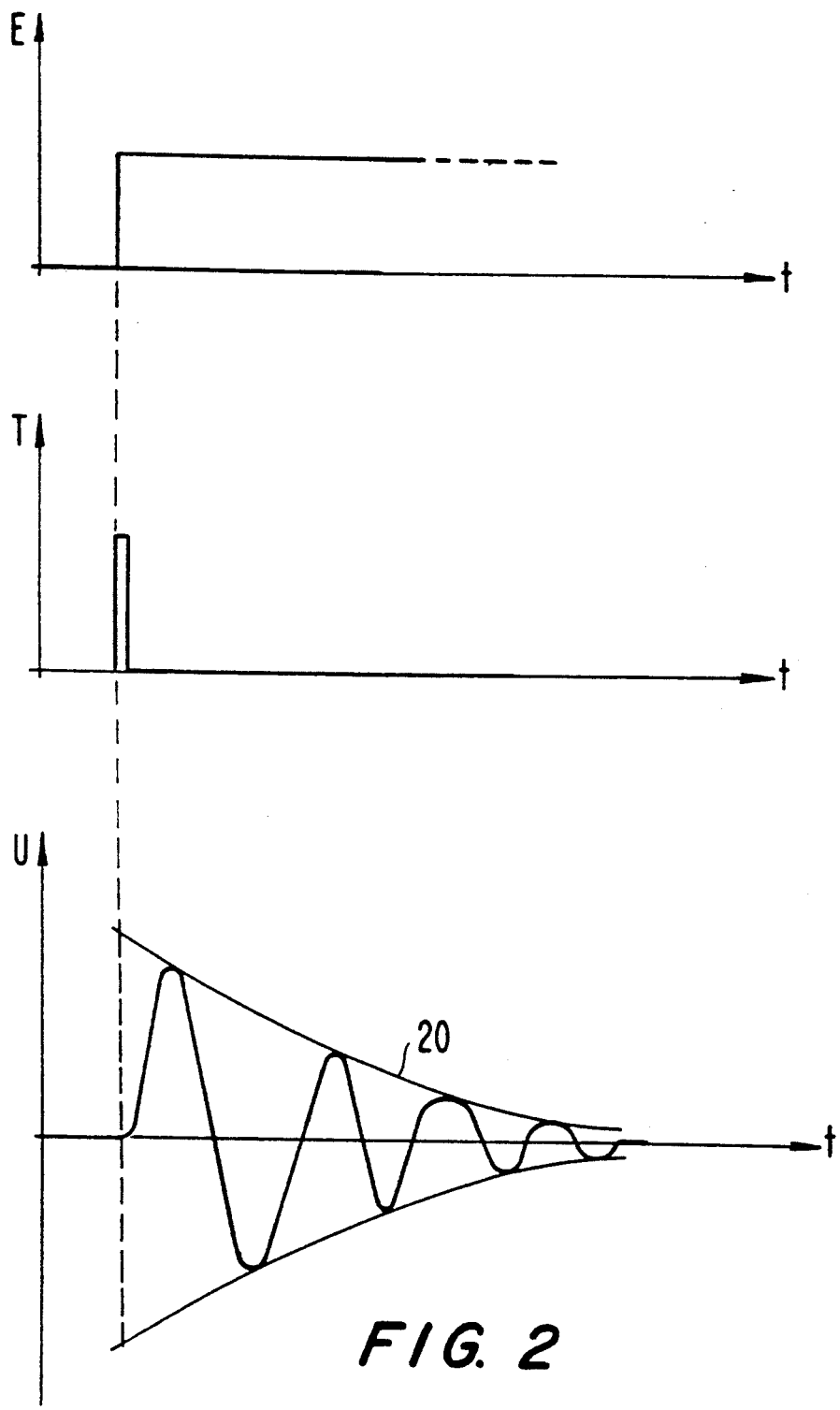
FIG. 2 is a graphical illustration showing signal characteristics of an input signal, an exciting signal and a voltage occurring in a resonant circuit.

The upper part of FIG. 2 shows the temporal characteristic of the lamp switch-on signal E, with which the operating circuit means 14 is to be activated to operate the gas-discharge lamp 10. The central part of FIG. 2 shows an exciting signal T transmitted by the operating circuit means 14 to the ignition resonant circuit 11, 12, 13, and the lower part of FIG. 2 shows a decaying oscillating voltage U in the resonant circuit 11, 12, 13, which is detected by the signal-processing circuit means 17 and triggered by the exciting signal T. The envelope of the decaying oscillation is designated by the reference numeral 20.

The mode of operation of the arrangement shown in FIG. 1 is explained in more detail with reference to the signal characteristics shown in FIG. 2.

The switching on of the gas-discharge lamp 10 is triggered by the lamp switch-on signal E, which is fed to the operating circuit means 14. Thereupon, the operating circuit means 14 transmits an exciting signal T to the ignition resonant circuit 11, 12, 13. The exciting signal T can, for example, be generated by the AC voltage generator 16, which is contained in the operating circuit means 14. The resonant circuit 11, 12, 13 assigned to the lamp 10 is drawn as a series resonant circuit. It is possible to use further resonant circuit arrangements which lead to a voltage increase in the lamp 10 when they are excited with a specific frequency. The lamp 10, which is not yet ignited at this point in time, initially has no effect on the electrical behaviour of the arrangement shown in FIG. 1. The exciting signal T excites the resonant circuit 11, 12, 13 to oscillations whose voltage U is measured across capacitive element 12 by the signal-processing circuit means 17. Instead of voltage measurement, measurement of the current in the resonant circuit 11, 12, 13 is also possible.

The circuit means 17 determines from the signal characteristic U of the oscillation of the resonant circuit 11, 12, 13 the resonant frequency. For the purpose of the ignition process of the lamp 10, which now follows, the circuit means 17 controls the AC voltage generator 16 of the operating circuit means 14 via the control signal 18 in such a way that the AC voltage generator 16 oscillates at the resonant frequency just determined. After a short test phase, which serves to determine the resonant frequency of the resonant circuit 11, 12, 13, it is immediately possible to excite the ignition resonant circuit 11, 12, 13 at its actual resonant frequency, and this leads to rapid ignition of the lamp. The determination of the actual resonant frequency has the advantage that manufacturing tolerances of the elements 11, 12, 13 and of the further components, which are not shown in FIG. 1, do not, in common in each case with their long-term drift, play any role in the ignition of the lamp 10.

It is provided according to another embodiment of the method according to the invention that the signal-processing circuit means 17 analyses the decay process of the signal characteristic U. The circuit means 17 determines, for example, the envelope 20 of the voltage signal U. The decay process arises owing to the parasitic element 13 of the resonant circuit 11, 12, 13, which in the practical embodiment of the resonant circuit 11, 12, 13 is generally not provided as a discrete resistor, but is assigned to the inductive element 11 and/or the capacitive element 12 as a parasitic loss element, and effects a corresponding damping of the resonant circuit. From the envelope 20, it is possible to determine, for example, the decay constant or another decay coefficient, with which it is initially possible to conduct self-diagnosis of the entire lamp arrangement. The prescription of one or move values of the decay coefficient permits the detection of excessively strong damping, which can indicate an instance of failure. Defects can be detected in the resonant circuit 11, 12, 13, as can short-circuiting or single-sided earth shorts of the lamp leads. Should a fault occur, the circuit means 17 can immediately switch off the operating circuit means 14 via the control signal 18. A fault signal 19 is transmitted, if required.

In a particularly advantageous fashion, the detection of the decay processes also enhances the operational safety of the installation, since touching a voltage-conducting part in the lamp circuit by maintenance staff can likewise be detected from an additional damping of the resonant circuit 11, 12, 13, and thereupon the operating circuit means 14 can be switched off immediately. The enhancement of operational safety plays an essential role in particular when the gas-discharge lamp 10 is provided as a lamp in a motor vehicle headlight, and maintenance or repairs are undertaken on the lamp circuit by persons who at the time do not suspect that high voltages dangerous to life and limb occur at this point in the motor vehicle.

The operating circuit means 14 and the signal-processing circuit means 17 are largely implemented by software in a microprocessing system.

Elements 14 and 17 may be combined in a single unit or microprocessor.

While the invention has been illustrated and described as embodied in an apparatus and method of igniting a gas-discharge lamp, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Method of igniting a gas-discharge lamp, said gas-discharge lamp being connected to an ignition resonant circuit for generating an ignition voltage and an operating circuit means for the gas-discharge lamp, said operating circuit means including an AC voltage generator connected to the ignition resonant circuit for operating the ignition resonant circuit, said method comprising the steps of:

a. generating an exciting signal T in the operating circuit means on receipt of a lamp switch-on signal E by the operating circuit means;
   b. exciting the ignition resonant circuit with the exciting signal T to produce a decaying oscillating process in the ignition resonant circuit;
   c. providing a signal processing circuit means connected to the ignition resonant circuit for determining a resonant frequency of the ignition resonant circuit and also connected to the AC voltage generator;
   d. determining a resonant frequency of the ignition resonant circuit from the decaying oscillating process with the signal processing circuit means connected to the ignition resonant circuit; and
   e. operating the AC voltage generator at the resonant frequency determined in step d) by controlling the AC voltage generator with the signal processing circuit means.

2. Method according to claim 1, further comprising determining the resonant frequency from a decaying oscillating voltage of the decaying oscillating process.

3. Method according to claim 2, further comprising generating a signal on overshooting at least one predetermined parameter of the decaying oscillating voltage.

4. Method according to claim 3, further comprising triggering a warning message generating means with said signal.

5. Method according to claim 3, further comprising switching off the operating circuit means on receipt of said signal by said operating circuit means.

6. Gas-discharge lamp apparatus including a gas-discharge lamp, an ignition resonant circuit for generating an ignition voltage connected to said gas-discharge lamp, an operating circuit means for the gas-discharge lamp connected to the ignition resonant circuit, said operating circuit means including an AC voltage generator connected to the ignition resonant circuit for operating the ignition resonant circuit, and a signal processing circuit means connected to the ignition resonant circuit for determining a resonant frequency of the ignition resonant circuit and also connected to the AC voltage generator for setting the AC voltage generator to produce an alternating signal at the resonant frequency.

* * * * *